Patented Feb. 16, 1926.

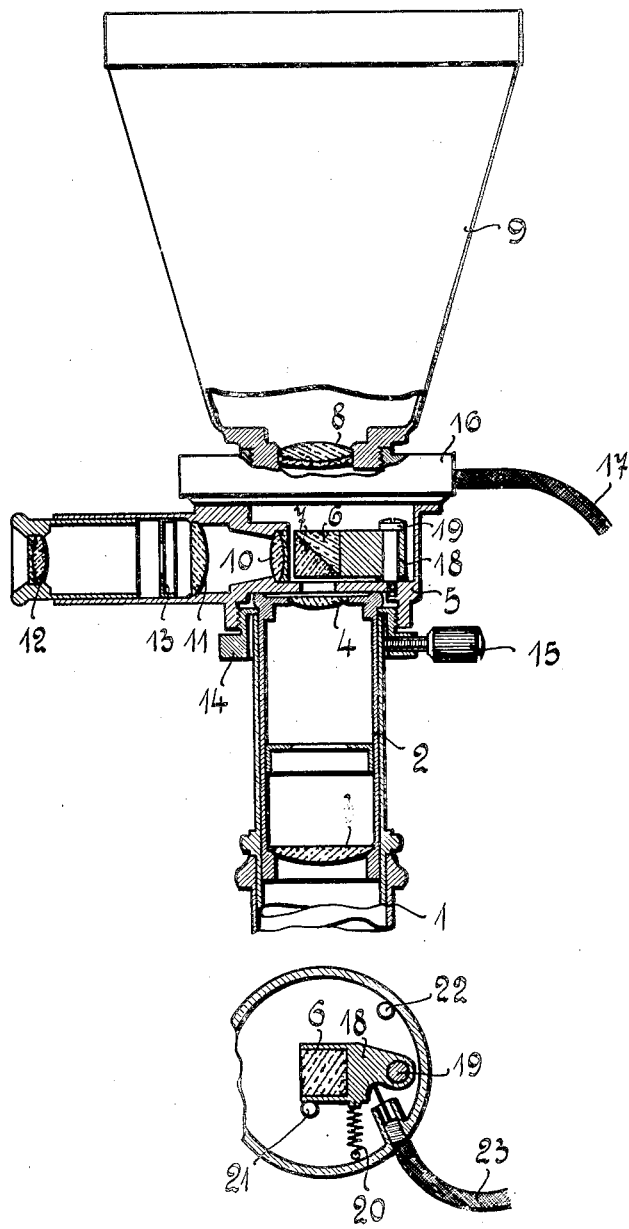

1,573,401

UNITED STATES PATENT OFFICE.

HERMANN HEINE, OF WETZLAR, GERMANY, ASSIGNOR TO THE FIRM ERNST LEITZ, OPTISCHE WERKE, OF WETZLAR, GERMANY.

PHOTOGRAPHIC CAMERA.

Application filed May 20, 1924. Serial No. 714,731.

*To all whom it may concern:*

Be it known that I, HERMANN HEINE, a citizen of Germany, residing at Wetzlar, Germany, have invented Improvements in Photographic Cameras, of which the following is a specification.

My invention relates to photographic cameras, and more particularly to such cameras adapted for use in combination with an optical instrument of compound construction provided with an eyepiece. The camera is fitted with a photo lens or objective which is to be placed behind the eyepiece of the instrument and will produce an image on the focussing screen or sensitized plate or film. Generally the instrument is so focussed that the light rays issue from the eyepiece in parallel pencils; consequently then the photo lens is focussed at infinity.

Though the invention is primarily intended for use in connection with microscopes, it may be applied also to other instruments as f. i. telescopes or spectroscopes.

The object of the invention is generally to provide a viewing aperture which allows to observe the object to be photographed in exactly the same state of adjustment as it will be produced in the camera.

To obtain a simple and convenient construction reflecting means are inserted in the path of rays between the eyepiece of the instrument and the photo lens. These reflecting means may be inserted into and drawn out of the path of rays, the latter for the purpose of avoiding a loss of light during the exposure. When it is intended to observe the object even during the time of exposure, partly transparent partly reflecting means are employed as f. i. a transparent silvering. For convenient observation a telescopic optical system may be arranged between the eye of the observer and the reflecting means, the field of view of the telescopic system corresponding, if possible, to the size of the photographic plate or film in the camera.

Although the mechanical construction can be carried out in various ways to suit the particular applications of the invention, simple and reliable means may be provided for mounting the camera with its accessory on the eyepiece of the instrument.

Other objects will appear as my invention is more fully hereinafter described, illustrated in the accompanying drawing and pointed out in the appended claims.

With these general statements of the objects of my invention I will now proceed to describe one embodiment thereof and the manner in which the invention may be carried out. It will be understood that while I have described what may be considered as a preferable embodiment of the invention, I do not limit myself to the precise constructions herein set forth, as they may be varied by those skilled in the art in accordance with the particular purposes for which they are intended, and the conditions under which they are to be utilized.

In the accompanying drawing Figure 1 is a vertical section of an improved photographic apparatus in combination with the body tube of a microscpe, and Figure 2 a horizontal section showing the changeability of a suitable reflecting device.

Referring to the figures: On the upper end of a misroscope body tube 1 is disposed an eyepiece 2 composed of a field lens 3 and an eye lens 4, above which in a casing 5 a prism system 6, 7 is situated. The prisms 6 and 7 are compound cemented having a transparent silvering on one of the inner cemented faces, so that a portion of the light rays issuing from the eyepiece 2 will be transmitted through the film of silver to a lens 8 in a camera 9; whilst the other portion of the light rays is deflected to a telescopic system consisting of an objective 10, a field lens 11 and an eye lens 12. In the focal plane of the eye lens 12 a mark 13 is provided for adjusting the eye lens to the sight of the observer.

By means of the telescopic system 10, 11, 12 the object is seen in the same manner as it will be produced by means of the lens 8 in the camera 9, the fine adjustment of the microscope (not shown in the drawing) serving for the focussing of the object in the usual manner.

The head of the eyepiece 2 is fixed between a suitable face of the casing 5 and a ring 14 that screws on the casing 5. By means of a clamping screw 15 the eyepiece 2 together with the casing 5 may be fixed on the tube 1. If the eyepiece 2 together with its attachment is drawn back from the tube 1, the eyepiece 2 may be taken off, after removal of the ring 14, and exchanged for another eyepiece if desired.

Between the prism system 6, 7 and the camera lens 8 a shutter 16 is placed which can be operated by means of a flexible wire release 17. The prism system 6, 7 is mounted on a holder 18 rotatable about an axis 19 and will be drawn by means of a spring 20 against a pin 21. The prism system 6, 7 may be put out of the path of rays during the exposure by pressing the holder 18 against a pin 22 by means of flexible wire 23.

The camera 9 with its lens 8 is fitted to the shutter 16 by means of a screw-thread and can be removed, if desired, and replaced by another camera of different size and provided with a lens of different focal length.

Having thus described my invention, what I claim and desire to secure by Letters Patent is:

1. Photographic camera having a photo lens adapted to be placed behind an optical instrument provided with an eyepiece, and reflecting means disposed in front of said photo lens and adapted for observing the object to be photographed.

2. Photographic camera having a photo lens adapted to be placed behind an optical instrument provided with an eyepiece, reflecting means disposed in front of said photo lens and adapted for observing the object to be photographed, and means for putting said reflecting means into and out of the path of rays.

3. Photographic camera having a photo lens adapted to be placed behind an optical instrument provided with an eyepiece, and partly transparent and partly reflecting means disposed in front of said photo lens and adapted for observing the object to be photographed.

4. Photographic camera having a photo lens adapted to be placed behind an optical instrument provided with an eyepiece, a telescopic optical system, and a compound prism consisting of two cemented prisms, the inner face of one of which carrying a transparent metallic film, the compound prism being disposed in front of said photo lens that the light rays are transmitted simultaneously to said photo lens as well as to said telescopic system.

5. Photographic camera having a photo lens adapted to be placed behind an optical instrument provided with an eyepiece, a telescopic optical system, a compound prism consisting of two cemented prisms, the inner face of one of which carrying a transparent metallic film, the compound prism being so disposed in front of said photo lens that the light rays are transmitted simultaneously to said photo lens as well as to said telescopic system, and means for putting said compound prism into and out of the path of rays.

6. Photographic camera having a photo lens adapted to be placed behind an optical instrument provided with an eyepiece, a telescopic optical system, a compound prism consisting of two cemented prisms, the inner face of one of which carrying a transparent metallic film, a shutter, a casing for mounting the different parts, a ring adapted for holding the head of said eyepiece, and corresponding threads on said casing and on said ring for fixing the latter on the casing.

In testimony whereof I have signed my name to this specification.

HERMANN HEINE.